United States Patent

[11] 3,603,349

| | | |
|---|---|---|
| [72] | Inventor | Irlin H. Botnick<br>3155 Kersdale Rd., Pepper Pike, Ohio 44124 |
| [21] | Appl. No. | 850,017 |
| [22] | Filed | Aug. 14, 1969 |
| [45] | Patented | Sept. 7, 1971 |

[54] PUSHBUTTON-OPERATED VALVE
16 Claims, 17 Drawing Figs.

[52] U.S. Cl. ................................................. 137/636.1,
137/599, 137/606, 137/607, 251/213, 251/229,
251/335, 251/368
[51] Int. Cl. ...................................................... F16k 19/00
[50] Field of Search ........................................... 137/599,
606, 607, 636.1; 251/213, 251, 335, 368

[56] References Cited
UNITED STATES PATENTS

| 2,075,600 | 3/1937 | Baker | 137/636.1 |
| 2,753,891 | 7/1956 | Parker | 137/607 X |
| 2,980,130 | 4/1961 | Harke | 251/335 X |
| 3,040,770 | 6/1962 | Boettcher et al. | 251/368 X |
| 3,370,609 | 2/1968 | Botnick | 137/607 |
| 3,468,344 | 9/1969 | Sanford | 251/251 X |

Primary Examiner—Robert G. Nilson
Attorney—Ely, Golrick & Flynn

ABSTRACT: For an elongated open-topped hollow body with a discharge outlet and hot and cold water supply connections each branching to respective lateral triplet sets of inlet ports opening into the body as a mixing chamber through hard smooth-faced port rings, in diametric hot and cold pairs at the intermediate locations and single hot and cold ports respectively near the body ends, a molded plastic support element integrally provides a body cover plate and four inwardly extending guiding cylinders for actuating pistons camming slide members in radial slideways of the support element toward respective inlet ports. Through a molded elastomeric diaphragm member enveloping the inwardly projecting portion of the support element and having a peripheral flange clamped between and gasketing the body and cover, the slide members resiliently engage hard lapped port-controlling ceramic disks, supported in caging rings as valving members cooperatively opposite respective inlet port rings. Above the cover plate is supported an array of four pushbutton rocker arms pin-and-slot engaged with the pistons. Plug valves respectively throttling hot supply to one and cold supply to the other intermediate port pairs preset two mixed flow temperatures, with four water temperatures thus available upon respective button selection in the flow determined by extent of pushbutton depression.

INVENTOR
IRLIN H. BOTNICK
BY
Ely, Golrick & Flynn
ATTORNEYS

INVENTOR
IRLIN H. BOTNICK
BY
ATTORNEYS

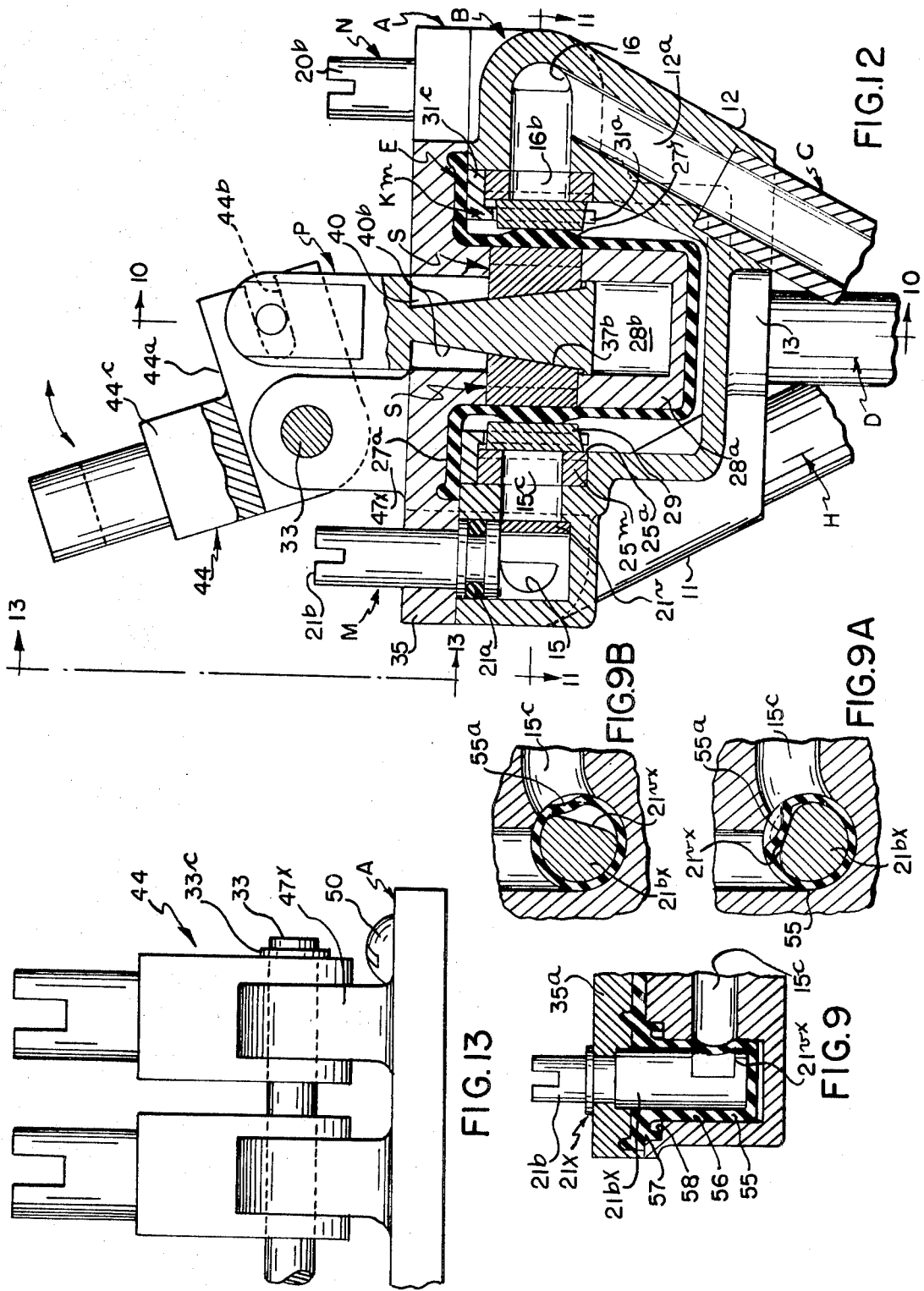

PUSHBUTTON-OPERATED VALVE

Various types of pushbutton mixing valves or faucets are already known to the prior art, whereby upon actuation of one of a plurality of pushbuttons, water at either hot or cold supply temperatures or some intermediate temperatures may be obtained as the discharge of the faucet.

Some such prior art proposals have required rather complex valve body castings or extensive machining of the body, for example, to provide one or more bores serving as mixing chambers and also to receive valving element components or subassemblies. In others, the mechanism between the pushbuttons and the actual valving elements have been either rather complex, subject to wear, or entailed certain undesirable cost of manufacture or assembly. Various of such valves further have lacked a certain desired durability and ruggedness, because of the inclusion of multiple O-ring or like seals between continually used moving surfaces, wherein the seals were subject to wear and consequent leakage, or leakage arising by other adventitious causes, e.g., by the intrusion between valving surfaces, or the embedding therein, of particles of debris, scale, silica or other material locally arising or perhaps even passing through supply line filter or screening devices provided against such an eventuality. In others the valving surfaces or elements themselves have been subject to undue wear and hence to leakage.

By the present invention there is provided a pushbutton-actuated mixing valve structure or faucet adapted, by actuation of a selected one of a plurality of pushbuttons, to deliver water at the cold or the hot supply temperatures or at preset intermediate temperatures; or if desired by actuation of a plurality of such pushbuttons, still other temperatures; the valve structure further either eliminating or minimizing several of the above described problems of the prior art.

The valve subject matter of this application comprises basically a simple hollow body casting, a diaphragm member sealing off the body, simple valve disks cage-mounted in the body chamber, and an integral cover plate and mechanism support; either the latter or a separate retainer plate mounting a pushbutton array for the mechanism.

All basic chamber and flow passages are provided in the body as cast; the body thereafter requiring subsequent machining of little more than the sizing of hot and cold water supply connections, of a discharge connection and of two plug-receiving bores, a simple facing of top edges to one plane and cutting or merely sizing internal opposed wall slots in which stationary valving elements are cemented. Further as will be seen from the structure hereinafter described in detail for a particular embodiment, the form of body required is such that it is relatively easily produced as a comparatively small and inexpensive casting in which the few required machining or finish operations in general are of a noncritical and relatively inexpensive character.

An integrally molded support structure provides a body cover plate and, in a dependent portion, four cylinders for actuating camming pistons; the cover plate peripherally clamping a top flanged resilient molded elastomeric element surrounding the dependent support portion and providing a body gasket as well as cylinder-sealing diaphragm. Simple cylindrical pistons, moldable from durable plastic, have longitudinal bottom-sloped cam grooves engaging slide blocks in cylinder radial slideways, which upon pushbutton reciprocation apply or release force through the elastomeric diaphragm against caged ceramic disk elements thereby to selectively open or close off inlet ports. The actual mouth of each port is provided by a hard ceramic ring cemented in the body; the annular end face of each ring and the opposed face of the cooperating hard ceramic disk being lapped highly smooth, so that by force resiliently applied through the camming system to hold a disk against its port an excellent watertight seal is obtained. The two valving sealing surfaces being highly wear, abrasion and corrosion resistant, a simple durable valving system results.

The integral cover plate-plural cylinder member, as a camming mechanism supporting frame, is readily molded of durable plastic with appropriate slideways and bores for the actuating slides and pistons. The latter similarly may be molded with pin formations for engaging pushbutton mechanism, and with cam grooves which if desired may be readily machined rather than molded.

The disks are held, freely movable within the required limits, in cages of retaining structure merely slid into place in the body for retention by the diaphragm member, and the cover plate-cylinder frame member secured thereover. Advantageously, the disks as the movable valving elements are here self-accommodating to the end surfaces of the port rings.

In assembly the cover plate-cylinder member as a frame with the plug valve elements inserted and the pistons and slide blocks already in place and with the diaphragm thereon, is merely applied to the body, the whole then finally secured in a watertight assembly. Pushbutton rocker arm devices engaging the respective pistons are carried either by the cover plate or by a separate screw-secured retainer plate superimposed on the cover plate. Thus simplicity of assembly is achieved, to which conduces symmetry of the structure and a small number of part types.

The entire structure as such presents a minimum number of points for possible breakage, wear or leakage; and by the durability of the effective cooperating valving and sealing elements provides a long effective and service-free life. Moreover, in the unlikely event of service being required, the structure is such that it is relatively easily serviced in its installed condition by operations carried out from above a sink environment.

The general object of this invention is to provide a pushbutton-actuated type mixing valve or faucet delivering hot, cold and at least one intermediate mixed water temperature upon selective actuation of an appropriate corresponding pushbutton, and this in a valve structure which is durable, and of long service life. Another object is to provide a valve of the character described which may be fabricated with a minimum of machining or finishing operations.

Another object is the provision of a pushbutton-actuated mixing valve wherefrom a plurality of water temperatures intermediate, and in addition to, hot and cold water supply temperatures may be obtained, the valve utilizing hard highly finished flat surface elements as the effective valving components. Another object is the provision of a valve structure involving a minimum number of part types for the structure and function attained. Another object is to provide a compact valve structure. A still further object is to eliminate sliding seals such as packing or O-rings between constantly used moving elements.

Other objects and advantages will appear from the following description and the drawings wherein:

FIG. 7 is a fragmentary detail of structure in a diaphragm member;

FIGS. 9, 9A and 9B are fragmentary vertical and two horizontal sectional details of a mixed water temperature regulator modification; FIGS. 9 and 9B showing a normally nonused "full off" position, and FIG. 9A a full open position;

FIG. 12 is a transverse vertical section taken at 12—12 in FIG. 10;

FIG. 13 is a fragmentary front elevational view taken as indicated by the line 13—13 in FIG. 12 showing a pushbutton mounting.

Figure 1:
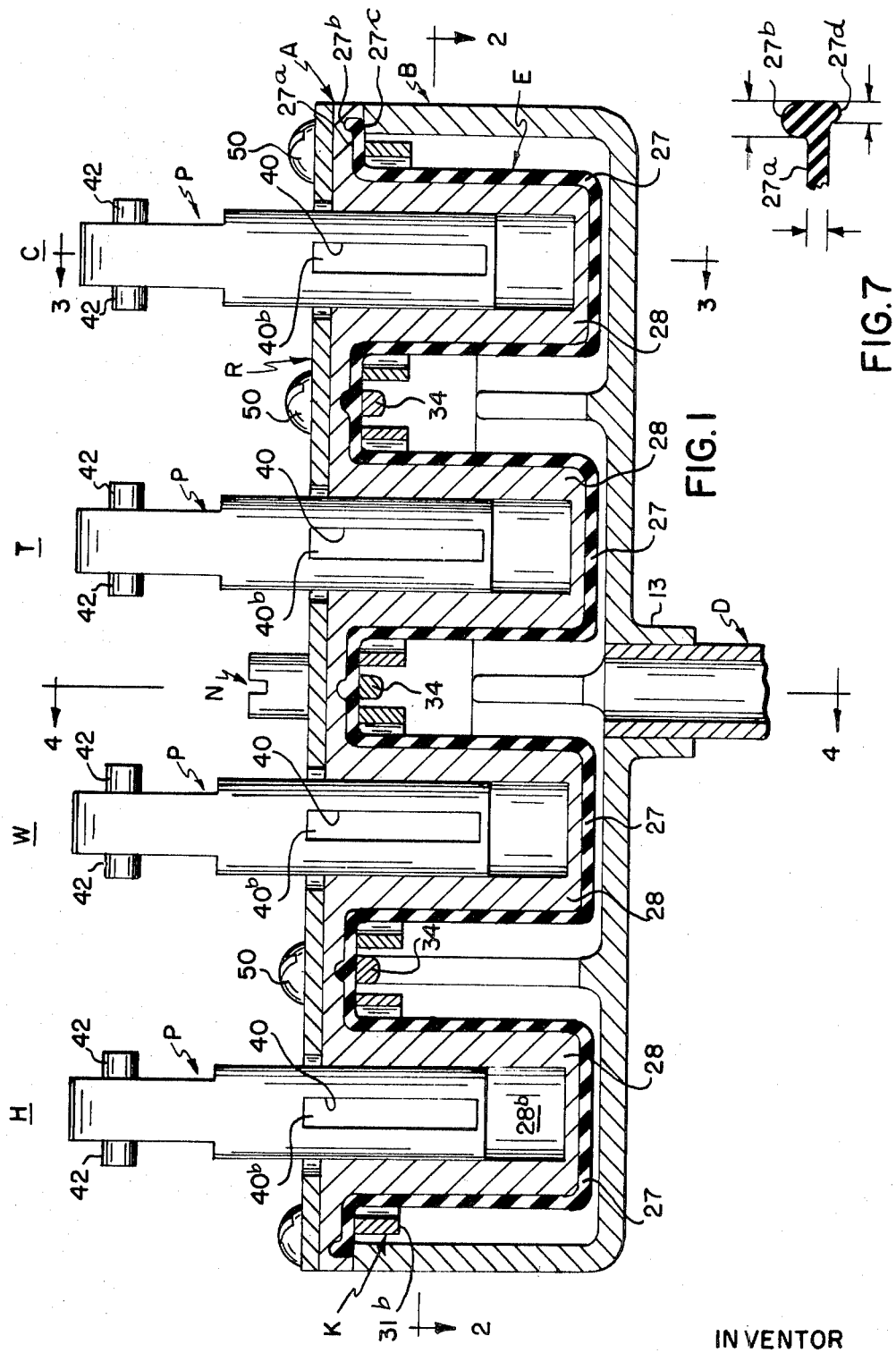
FIG. 1 shows a valve embodying the present invention in a vertical longitudinal section taken as indicated by the line 1—1 in FIGS. 2, 3 or 4.

In the drawings, FIGS. 1–6 represent a first specific embodiment of the invention in a pushbutton-operated mixing valve shown in totally "off" condition; and for convenient description, the body open side will be taken as at the top, though the valve may be installed in various orientations. The valve comprises as principal components, an open-topped hollow body casting B; an integrally cast or preferably molded plastic cover plate and plural cylinder frame member A providing four dependent closed-bottom cylinders (see FIGS. 2 and 3) to receive in smooth sliding reciprocating relation radial slide members S and also slide-actuating camming pistons P; a resilient, watertight, durable and tough molded elastomeric diaphragm element E providing as an integral structure four top-flanged cup-shaped diaphragms and in effect fitted to the bottom of the member A, and held captive between, and serving as a seal between the bottom surface of A and the top peripheral continuous wall edge surfaces of B; caged valving disk subassemblies K; two plug valve type temperature regulators M and N received in corresponding body top bores (see FIG. 4); and a stamped metal retainer plate R. The latter plate both secures the aforementioned components into an assembly when screw-secured or bolted to the body B, and also pivotally supports a parallel array of pushbutton rocker arms for valve actuating reciprocation of respective pistons P.

As the integral plate and plural cylinder member A serves as a supporting frame for pistons P and slides S associated with each cylinder portion 28, as hereinafter described controlling respective valve elements 29 which are operated at each of the four piston or cylinder locations to deliver a respective water temperature, the successive portions of the valve with their piston, cylinder, slides, diaphragm cup and caged disk subassembly will be referred to and identified by the water delivery thereby controlled; reading from the left in FIGS. 1 and 2, hot water, warm water, tepid water and cold water. Therefore the corresponding four sections of the valve and their respective assemblies of operative parts are described and are designated by the general section or assembly reference characters H, W, T and C.

The valve body B, member A, member E, and the valve assembly as a whole (apart from the supports for and the array of pushbuttons and rocker arms) are each generally symmetrical with minor divergencies about a longitudinal vertical center plane, and further are strictly symmetrical in a sense of twofold rotational symmetry about a vertical axis through the middle of the body, at the discharge outlet.

In the individual sections controlled by respective pushbuttons, in general the structure is practically identical except as results from the fact that the like hot and cold water sections have but a single control port each, in contrast with the two identical intermediate sections with two ports each.

The body B, for example, a brass sand casting, for receiving the hot and cold water supply piping or tubing H and C and discharge piping D which may be factory brazed in place, (see FIGS. 1, 2 and 4), near midlength is provided with respective bottom piping connection formations 11, 12 and 13 opening upwardly at the front and back through inlets 11a and 12a to the bottoms of respective offset, enlarged vertical bores 11b, 12b, accommodating the top-inserted plugs 20, 21 in temperature regulators M and N, with the discharge connection 13 opening directly into the interior of the mixing chamber formed by the aforedescribed structure.

On the front and back sides of the body (see FIG. 2), are horizontal hot and cold water manifold or distributing passages 15, 16, intersecting the vertical bores 11b, 12b, to serve respective triplet sets of mixing chamber inlet ports. Thus hot water passage 15 opens at the extreme left or hot water valving section H through a single port 15a; at the intermediate or warm water valving section W, through the hot port 15b; and at the other intermediate or tepid water valving section T, through 15c. The cold water distributing passage 16 similarly opens through the cold water inlet port 16a, the sole port in the extreme right or cold water valving section C, at 16b (opposite to 15c) to the tepid water control section T, and at 16c (opposite 15b) to the warm water control section W.

Temperature regulator N, to which M is essentially identical (see FIG. 4), comprises merely a cylindrical plug 20 circumferentially grooved for an O-ring 20a sealing it to the bore 12b, and having its cylindrical-surface locally extended to the shouldered bottom of 12b in a narrow vane 20v, adjustably positionable in the flow path of cold passage 16 to the left (in FIG. 2) toward port 16c by screwdriver engagement in the end-slotted stem 20b projecting through a corresponding aperture in and retained by retainer plate R. In the regulator M for the plug 21 received in the bore 11b like parts are indicated by letter suffixes like to those used for 20. Preferably appropriate index marks on the stems and plate R or member A indicate orientation of the respective vanes.

Plug rotation sets the vanes to throttle the flow from the cold and hot water manifolds 16, 15 respectively (see FIG. 2) for obtaining temperature presetting for the mixed water to be delivered by the warm water section and the tepid water section.

In each section, oppositely paired vertical flat bottom slots, formed as by an end mill, extend from the top of the casting downwardly to terminate in rounded ends concentric with the respective inlet ports, (hence providing four slots on each side) the slot width, bottom radius and central depth corresponding to the diameter, radius and approximately the axial length of respective hardened ceramic rings 25 seated and cemented at the slot bottom ends to form the mouths of, or actual outlets of, the respective inlet ports.

These rings are formed of a very hard, noncorroding, wear-resistant material, preferably a ceramic such as the aluminum oxide type, e.g., Alundum, but usable also would be one of the hard metal alloys, such as Stellite or others now known. The free face of each port ring 25 is lapped or highly smoothly finished in some other manner substantially perpendicular to the ring axis against which seals the cooperating lapped, flat smooth face on a disk 29 of similar ceramic material, the disk and ring being the actual effective valving elements.

In the portless slot of hot and cold water sections, since here there are no opposed slides simultaneously cammed in counterbalancing manner, instead of such ring, there appears a filler block 26 having a base 26a of the same diameter and axial length as a ring 25 and a cylindrically concavely faced extension 26b as a reaction member engaging, through the adjacent diaphragm cup portion 27, and supporting against camming reaction forces of the piston, the side of the corresponding cylindrical portion 28.

In each of the aforementioned subassemblies K, a respective mounting ring 31 supports the two disks 29 (for section W or section T) or the block 26 and disk 29 (for section C or section H). Each disk-supporting ring 31 (see FIGS. 5 and 6) comprises a body ring portion 31b, and at diametric locations, dependent, three-quarter circular, disk-caging formations 31a loosely embracing the respective disks, or a disk and a block portion 26b, and also diametrically aligned outward end projections 31c; the extreme dimension between the projection end faces being equal to the distance between the bottoms of opposed slots. The downward opening in 31a, about a quadrant in extent, provides additional water flow area from the controlled port.

To allow disk displacement from the port, while retaining the disk during assembly, the internal surface of each disk cage portion 31a is inwardly convergently tapered to correspond in angularity to a male taper convergent away from the sealing face of each disk 29; and the inner end diameter of 31a corresponds to the outside diameter of the broadest, sealing end of the disk. The top coplanar surfaces of the diametrically opposite aligned endwise projections 31c are coplanar continuations of the top surface of the ring body 31b; each projection 31b corresponding in width to the port ring receiving slots and having an upwardly concave bottom complementary to the port ring curvature. The disks each may be stepped, that is, shouldered rather than tapered to provide a larger diameter for disk retention between the port seat and caging ring; and each provided at the center of its smooth, sealing face with a shallow recess, smaller, of course, than the stationary ring port diameter for noise reduction purposes.

Thus a mounting ring 31, with disks (or a disk and filler block) disposed therein, may be slid into the body casting from above with the projections 31c in the corresponding slots engaging the respective rings 25, and in the case of the hot and cold assemblies also while carrying the base of the opposite reaction block 26 down into the bottom end of its slot.

Thereafter upon assembly of the valve with the flange portions 27a of each of the cups 27, i.e., of the member E, pressed downward and anchored as hereinafter described between member A and the edges of body B, a downward retaining force, applied to the ring body 31b particularly over the projecting portions 31c, holds the latter firmly in the slots, and hence the disk-caging rings 31a and disks 29 in position opposite the port rings 25.

Figure 2:
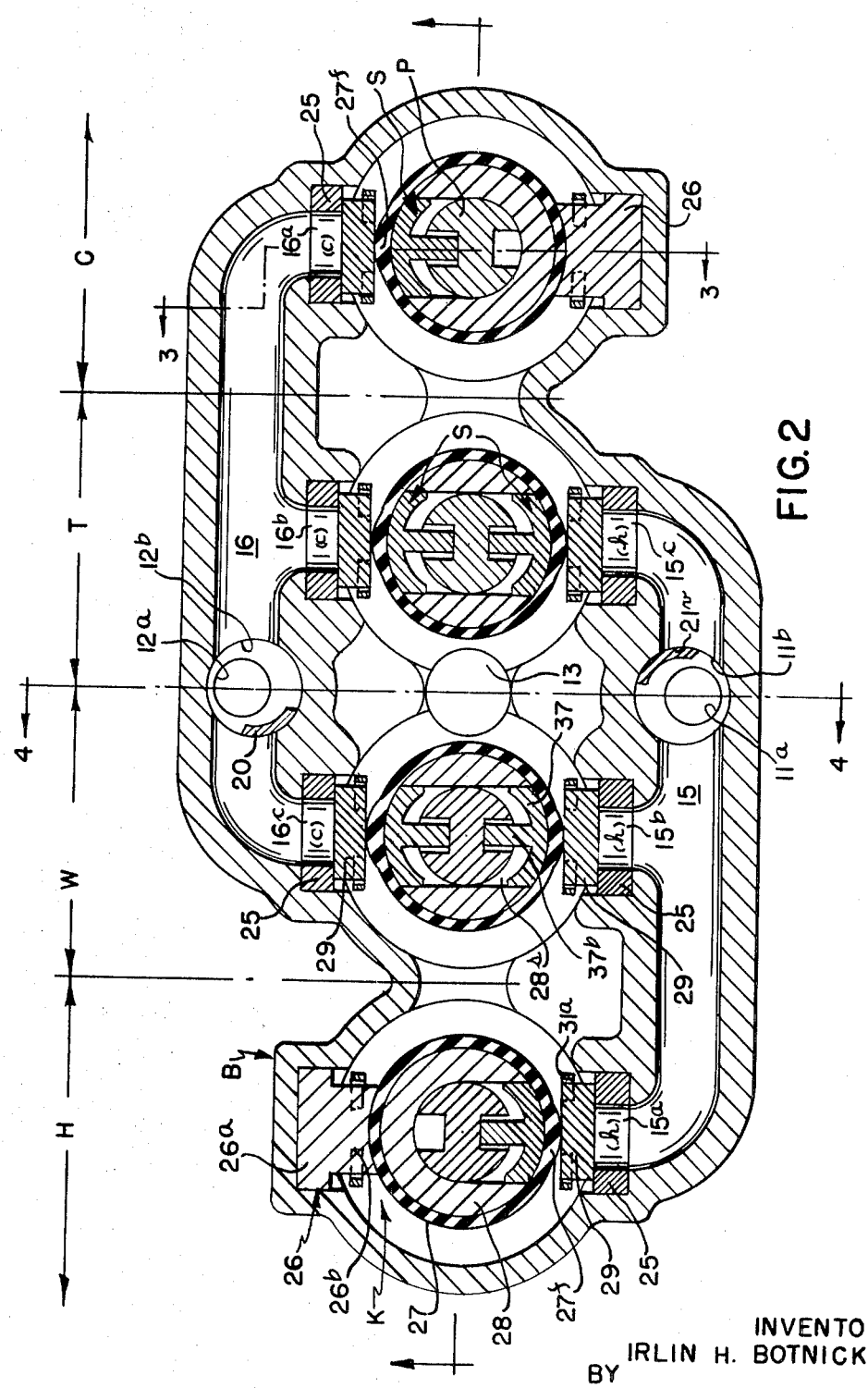
FIG. 2 is a horizontal section through the valve of FIG. 1 taken as indicated by the line 2—2 in FIGS. 1, 3 and 4.

As may be seen in FIG. 2, the diameter of the port rings 25, therefore the slot widths, also the spacing of the cage 31a from the rings 25, is such as to provide ample flow space to water leaving a port, even when the valving disk is permitted to be displaced to full flow open position.

The described element E comprises four equispaced cylindrical flat bottomed cup-shaped portions 27, complementary in shape to the respective dependent cylindrical portion 28 of the assembly A; and the above mentioned outward top flange portions 27a extend coplanar to each other outwardly around the entire periphery of each cup, forming connecting portions 27c between the successive cups extending over and supported by short transverse bridging elements 34 of the body B. The portions 27a in extending outwardly to partially overlap continuously the top edge of the exterior peripheral wall portion of the body B, therefore covering the slots, form a planar portion of member E serving as a body-sealing gasket.

For this purpose (see also FIG. 7) on the top surface of the element E, and running along its entire peripheral, somewhat scalloped margin and formed as it were of circles merging to pass above bridges 34, there is an upward bead 27b semicircular in cross section; the lower flange surface having a corresponding shallower arcuate bead formation 27d. The bead 27b is received in corresponding grooving on the underside of the plate portion 35 of A, the thinner bead bearing on the body edge ensuring a good compressive sealing between the body B and the plate portion 35 of A as a casting cover. In effect the top surface of the elastomeric element E is fitted to or complementary to the bottom surface of the assembly A.

Figure 3:
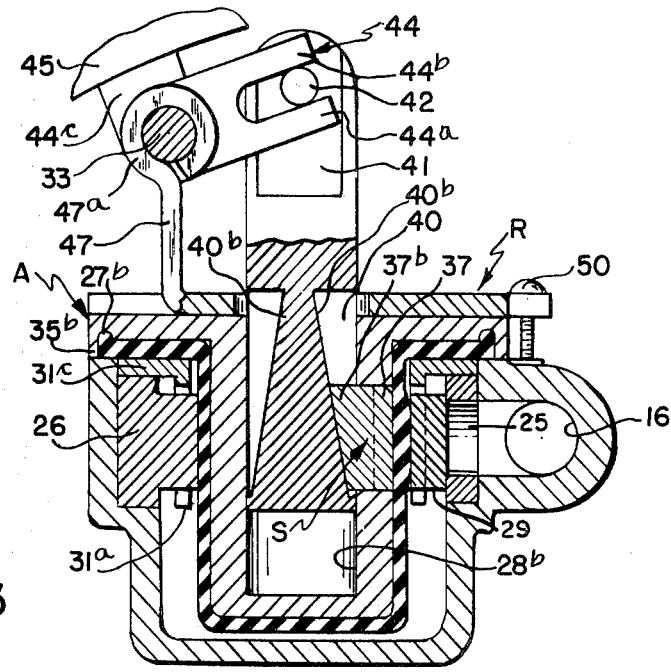
FIG. 3 is a vertical transverse section taken as indicated by the line 3—3 in FIGS. 1 and 2.
Figure 4:
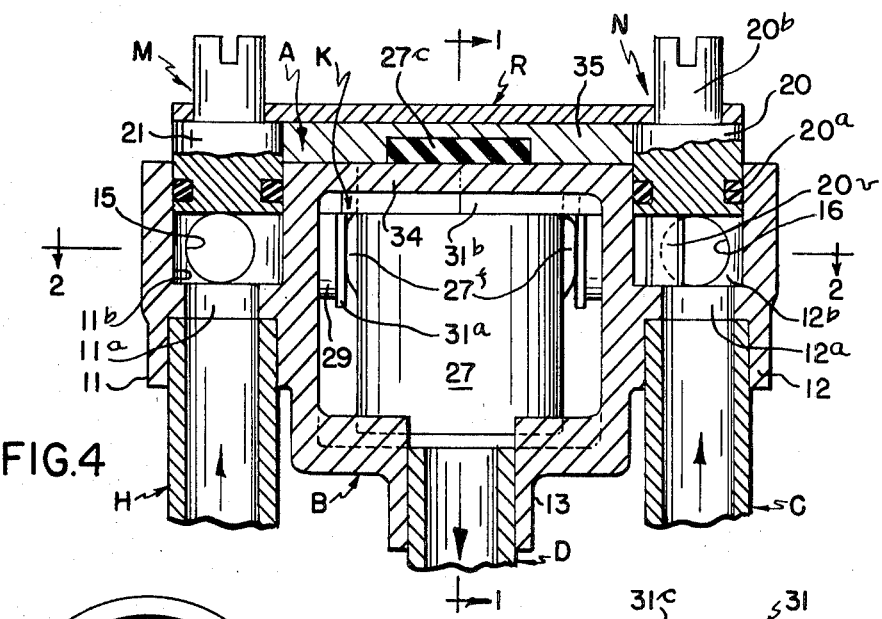
FIG. 4 is another vertical transverse section taken as indicated by the line 4—4 in FIGS. 1 and 2.
Figure 5:
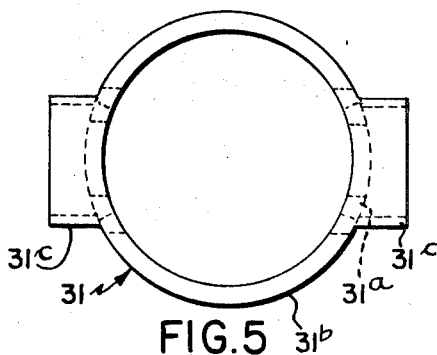
FIG. 5 is a detail top plan view of a valving disk caging mounting ring.
Figure 6:
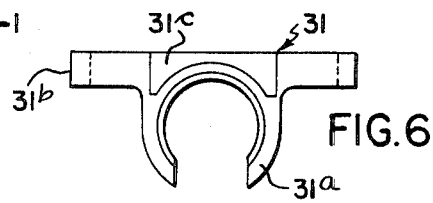
FIG. 6 is a detailed end elevational view taken as indicated by the line 6—6 in FIG. 5.

Also, as may be seen in FIGS. 2, 3 and 4, the cylindrical or cup portions 27 at the location of each valving disk are thickened in a slight outward, somewhat domelike, wall protuberance 27f. The resiliency and shape of this region of 27f aids the self-accommodation of the disks 29 to the rings 25 under the communicated slide thrust; and gives a secure and smooth pushbutton closing actuation. Moreover, due to the rotational symmetry of members A and E and of the casting, particularly in the casting top edge, there can be no misorientation of the members E or A relative to each other or to the body.

The top surface of the plate portion 35 in member A is flat; but between the hollow cylindrical portions 28 and the external edges, the under surface is relieved or recessed to receive the aforementioned flanged and beaded portions of the element E; the entire periphery, outside the beaded margin of the diaphragm element E, being continued downwardly in a lip 35b to directly engage the corresponding underlying top edge of the body. The cover plate portion 35, through which open the equispaced piston bores 28b, is further apertured or edge noticed to accommodate upper body portions of the regulating elements 20 or 21.

In cylinder portions 28 (see FIGS. 2 and 3) at inlet port level, like slide members S are disposed in square-section radially directed slideways 28s, aligned with the respective inlet ports and in width equal to the diameter of the intersecting bores 28b.

In each slide member S the outer or front face of the body 37 is substantially of the same cylindrical curvature as the cylinder portion of A, as viewed in front elevation being of square outline to fit the slideway; and on a rearward projection 37b engaged in the piston-camming groove or slot 40, the back face is sloped out of the vertical complementarily to the sloping groove bottom 40b provided as a slide-camming surface.

Each such substantially rodlike piston P is provided with a diametric pair of such longitudinal camming slots 40 with the bottoms 40b upwardly convergent, though one such groove is functionless in hot and cold sections, so that being identical the pistons are interchangeable. At the top piston end, through or on the diametrically opposed parallel flats 41 there is a through pin 42 or a pair of respective opposed pin projections integrally molded thereon, engaged in parallel slots 44b in the bifurcated end of lever 44a of a pushbutton rocker arm 44.

The other lever arm 44c carries preferably a respective removable snap-on pushbutton or an integrally molded pushbutton formation 45; the rocker arms, hence pushbuttons, being maintained in spaced relation on a common shaft 33 passed through end-curled knuckle formations 47a of supports 47 struck upwardly out of the stamped metal retainer plate R; the intervening knuckles serving as rocker arm spacers.

Thus the plate R is appropriately apertured for the pistons, for the regulator stems, and for securing bolts 50 threaded into tapped body apertures or bosses located exteriorly of the plate A or otherwise at appropriate locations so as not to interrupt the chamber seal provided by member E.

Figure 8:
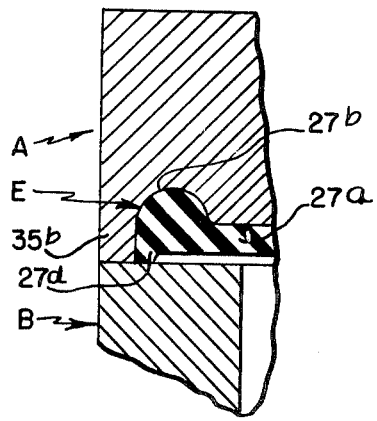
FIG. 8 is an enlarged fragmentary detail of a sealing arrangement, applicable to the valve forms of FIGS. 1-6 and FIGS. 10-13.
Figure 11:
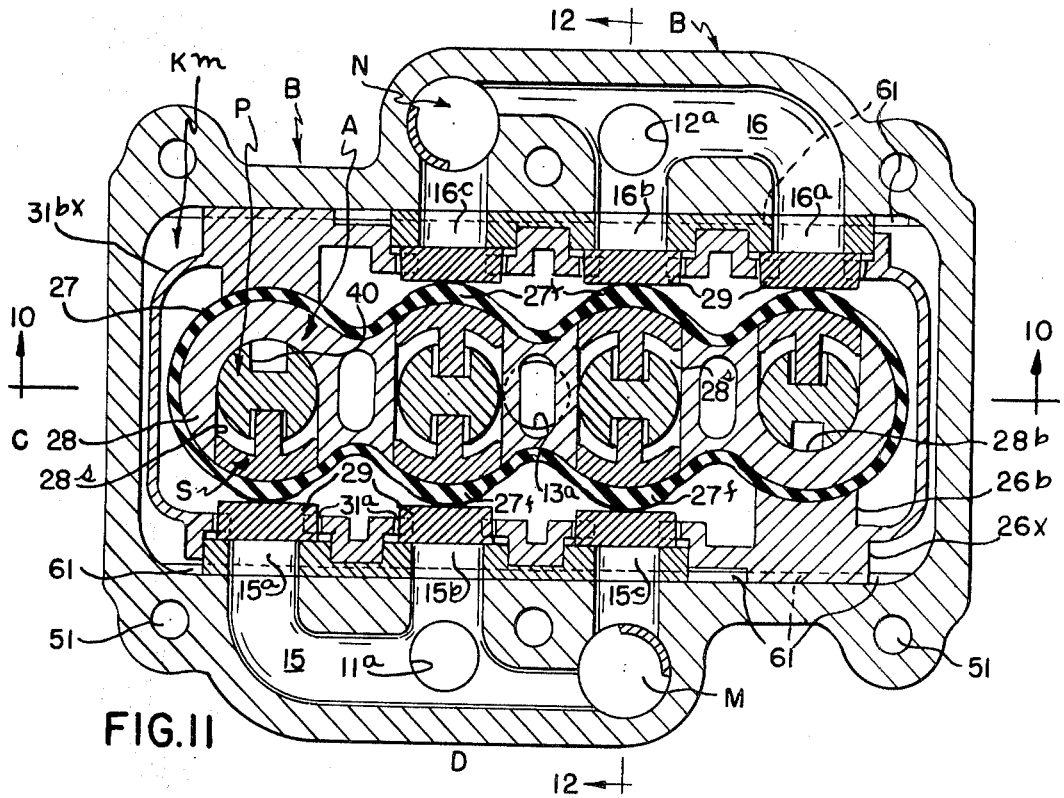
FIG. 11 is a horizontal section taken as indicated by the line 11—11 in FIG. 10.

In FIG. 8 there is shown a modification of the sealing arrangement of FIG. 7 in which the general thickness of the horizontal coplanar portions 27a of the diaphragm element E is markedly thinner than (less than half) the radius of the upper semicircular bead 27b, and also less than the downward, projecting, body edge contacting lip or edge portion 35b of the plate portion 35 in member A; the under bead 27d being smaller in radius than in FIG. 7. This provides, inward of bead 27d, a space between the diaphragm horizontal portion 27c and the body top edge, so that after initial seal-instituting compression, due to the dimension from the top or upper bead to bottom of lower bead being greater than the space between the bottom of lip 35b and top of the groove receiving bead 27b, the water pressure in the mixing chamber acts to increase the sealing effect by pressing lower bead 27d firmly against the adjacent vertical surface of the lip 35b and the horizontal surface of the body edge.

In FIGS. 9, 9A, 9B for each temperature regulator the rubber diaphragm member E has an integral downwardly projecting thimble or sleeve 55 fitted in the respective body bore 56; the thimble having an inwardly moulded dimple 55a centered at the port level at the location on the circumference shown in FIG. 9A to connect port 15c and 15. The regulator plug 21x, on its cylindrical portion 21bx received in the thimble, at the level of the ports and hence of the dimple (see FIGS. 9A, 9B), has a recess or flat 21vx which not only accommodates the "as-molded" dimple at open position (FIG. 9A), but also allows the thimble locally to deform further inwardly under pressure. As the plug is turned clockwise from FIG. 9A position the trailing rounded edge of the flat displaces the local inward deformation and dimple outwardly, decreasing the flow area until at the full closed position (FIG. 9B) the sleeve is in sealing contact with the bore wall at a location between the two ports. Thereby the flow area to inlet port 15c is varied. The plug 21x is journaled in a bottom counterbore of the aperture through plate portion 35 of member A for the stem 21b; the plug being retained by member A. Again a circumferential downward bead or lip 57 spaced from sleeve 55 engages a shoulder 58 provided by a counterbore to regulator bore 56; so that under applied water pressure the lip is pressed outwardly against the counterbore for increased seal under increased pressure.

The modification of FIGS. 10–13 is generally similar to that of FIGS. 1–6; but the body B is of a generally hollow rectangular block form with straight opposed sidewalls through which the hot and cold passages 15 and 16 open at the controlled inlet ports; and the functions of the retainer plate R in FIGS. 1–6, as mounting the pushbutton array and retaining the temperature regulating plugs, are assumed by the member A with elimination of the plate R of the prior figures. Also the diaphragm element E, the disk-caging elements 31 and stationary hard elements are modified as next described.

Like reference numerals to those of FIGS. 1–6 are here used for like or analogous parts.

Here though the member A yet provides the cylindrical closed bottom vertical guide bores 28b for the piston P, its downward portions containing the pistons are not separate, but as it were integrally merged, hollow cylinders; giving added rigidity, shortening the length of the portion dependent into the hollow body, thereby allowing a smaller casting for body B; and the embracing portion of the diaphragm accordingly is constituted not of four cups, but is rather a dependent troughlike structure with sinuous long sidewalls corresponding in shape to the lower or operator support part of member A.

As contrasted to an alternative form providing straight-sided rectangular shapes for the dependent parts of A and E in this modification, this provides greater flow area from each port-valving region, also allows the slide-backed and -advanced protuberant portions 27f of the elastic diaphragm the more readily to move back under line pressure on valve-opening piston descent.

The caging Km is here a multifunctional component incorporating integrally with a frame 31bx, generally rectangular in plan, in one molded plastic structure several functional parts which in the structure of FIGS. 1–6 are provided by separate parts, and here designated by like reference numerals, namely two backup elements 26x, as well as six disk-caging formations 31a and also slot top fillers 31c.

Figure 15:
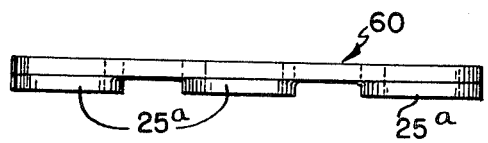
FIGS. 14 and 15 are front elevational and top edge views of a modified form of the stationary valving element inserts used in FIGS. 10–13.
Figure 14:
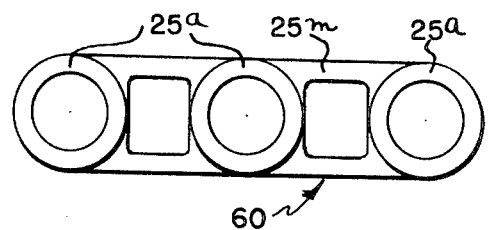

The three required stationary ring valve elements on each side are embodied in a single elongated triple port element 60 (see FIGS. 14–15) as three spaced rings 25a integrally connected by thinner struts 25m forming parallel top and bottom element edges. Each long side of the body B is edge-slotted or rabetted to a shoulder 61 beneath the casting inlets supporting the respective member 60 cemented in place with the openings at port ring portions 25a, aligned with the inlet mouths at 15a–15c and 16a–16c. A space between the top edge of the casting and the straight top edge of each member 60 is filled by a longitudinal portion of frame 31bx from which depend caging elements 31a and also, as end fillers, the block portions 26x.

Figure 10:
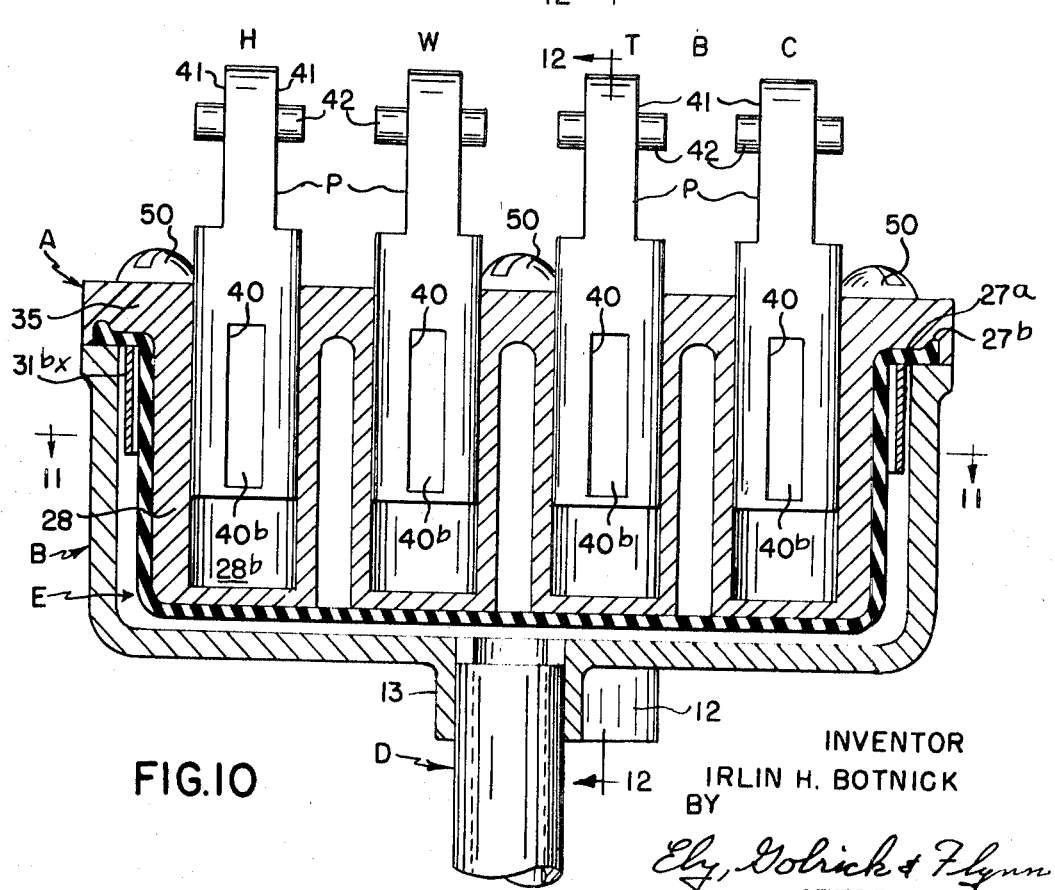
FIG. 10 is a vertical longitudinal section, similar to FIG. 1, for a modified form of valve.

The elastic diaphragm element E has its top flange portion, here of generally rectangular plan, beaded and engaged between the top edge of the body and the bottom of plate A as previously described for FIGS. 7 or 8, being clamped by A against the body edge and top of the cage elements Km as shown in FIGS. 10 and 12.

The body is also further modified by displacing the bore for each temperature-regulating plug and the corresponding supply inlet connection from each other, and both from the center of the body, with the inlet connection formations 12, 13 on opposite sides of the vertical transverse plane so that the hot and cold piping H and C may be angled up and outwardly from a more compact association with the discharge pipe D.

Member A is thickened somewhat in its plate portion 35, being directly secured by screws 50 threaded into corresponding outward lugs 51 on the body, and serving to retentatively engage also the plug body portions in M and N as well as clamping diaphragm member E. Four apertured integral upward posts 47x on member A, each adjacent a respective piston aperture of plate A, locate respective identical button rocker arms 44, conveniently molded of durable tough hard plastic. The pushbutton rocker arm mounting and piston connection are similar to the corresponding parts of FIGS. 1–6. Each rocker arm thus has a slot running through the lower arm in which are received the respective top end of a post 47x at its apex, and the respective top piston end at its free end; the rocker arms being pivotally secured by a common shaft 33 passed through the arms and posts and held by C-spring rings 33c in grooved opposite shaft ends. Again the pins for pin formations 42 of the piston are engaged in end slots 44b of respective lower arms 44a.

The cover plate and integral multiple cylinder frame A, the actuator slides S, rings 31 or multiple cage Km, and pistons P may be produced in finished form by molding from appropriate modern durable dimensionally stable plastics such as Zytel or Delrin, inasmuch as close tolerances are not necessary among the sliding surfaces, since at none of these cooperating surfaces is there any sealing required, all sealing rather provided by the diaphragm element E.

The resilient yieldable application of sealing pressure to the disks, and also the loose mode of disk support permits the disks to seat and accommodate themselves properly to the opposed port ring faces. This is highly advantageous should some foreign particle, such as a chip or grit, particularly silica or the like, be caught between the port ring and disk; for upon full closing pressure applied through the pushbutton and raising a piston, the yieldability protects against chipping or fracture of the sealing elements if the foreign body is not crushed. Though such an uncrushed particle or even debris thereof between the sealing faces would prevent proper sealing, hence cause leakage, mere reopening and closure by pushbutton actuation will allow the particle or its debris to be flushed away.

In operation, as a piston is displaced downwardly by pushbutton action, water pressure pushes the disk or disks open increasingly for increasing flow corresponding to the extent of piston cam slope and hence slide recession as appears from FIGS. 3 or 12.

Where either the hot or the cold pushbutton is solely actuated toward "open," only hot or cold water flow results from the supply line through the ports to the outlet in volume rate corresponding to the piston descent, hence button action; while if either the warm or tepid piston descends, a corresponding mixed water flow, of preset temperature, ensues from the two controlled ports of the section. Of course, if two buttons are pressed, other temperatures (not preset) may be found.

Thus as the vane 20v is settable from a position where it has no throttling effect, through the position shown, towards an even more completely throttling position, the setting of the regulator N plug 20 therefore is used for setting the "warm" mix temperature delivered by pressing the button of section W, that is, a temperature between that of the hot supply and that resulting from equal hot and cold water flow; while conversely the regulator M by positioning 21v presets for section T the lower side of the intermediate temperature range, between the temperature of the cold water supply and the temperature resulting by equal hot and cold flow.

I claim:
1. A mixing-type water valve for controlled volume delivery selectively of hot water and cold water at respective supply temperatures and mixed water at least one preset intermediate temperature, comprising:
  a hollow casing including an open-topped hollow body and a cover member secured to and closing the body top,
  said body having an outlet, a cold water supply-connected passage opening through at least two lateral cold inlet ports into the body hollow, a hot water supply-connected passage opening through at least two lateral hot water inlet ports into the body hollow, said cover providing operator support means extending into the hollow of the body;

an elastic resilient fluid-impervious diaphragm member surrounding said support means within and sealed to the casing to define fluid flow space between said inlet ports and said outlet, said diaphragm member sealing said support means off from water in the valve;

a fixed valving surface surrounding each said inlet port and a cooperating moveable valving member having a face engageable with said fixed surface continuously around the respective inlet port, the engageable areas of each said face and surface being finished to smoothness providing an effective fluid seal when held in engagement;

said moveable member supported for movement toward and away from said surface as between valve closed and full open positions;

a first valve operating means controlling only a first one of said hot water inlet ports for controlled delivery of hot water;

a second valve operating means controlling only a first one of said cold water inlet ports for controlled delivery of cold water;

each said valve-operating means including a portion moveable in said support means in one direction to communicate motion and force through said diaphragm to the respective port-associated moveable valving member to move the latter toward and hold it in valve closed position against fluid pressure at the respective inlet port, and moveable in a second direction for valve opening; and a third valve-operating means controlling simultaneously the other said hot and cold water ports for controlled delivery of mixed water at an intermediate temperature, said third operating means including portions moveable in said support means in respective first directions to communicate force and motion through said diaphragm to the moveable valve members for the other said hot and cold water ports to move toward and hold in valve closed position the last said members, and moveable in opposite directions toward valve open positions.

2. A valve as described in claim 1, wherein each said face is provided by a hard annular element as an insert bonded within the casing body to form the mouth of the respective inlet port and having the end surface about the mouth finished highly flat and smooth, and the cooperating said moveable member is a plate element of hard material having a face disposed toward said insert finished highly flat and smooth.

3. A valve as described in claim 2, wherein said elements are comprised of a hard ceramic material.

4. A valve as described in claim 1 with said support means integrally formed on, and projecting into the body from, the inner side of said cover, said support means having at least three spaced bores opening through the cover, and radial slideways intersecting respective bores and opening toward the diaphragm in alignment with each respective inlet port;

said diaphragm member comprising an elastomeric member having a hollow body portion surrounding the inwardly projecting said support means and a peripherally continuous laterally flanged portion sealingly engaged between the cover and the casing body;

said operator means comprising a slide in each said slideway and a slide-operating stem members moveable in respective bores having a camming engagement with the slides for camming the slides outwardly against the diaphragm and thereby to move the respective valving members toward closed position.

5. A valve as described in claim 4, wherein each said operating stem member is a pistonlike element reciprocable in the respective bore and having a longitudinally sloping cam surface engaging a respective said slide;

said stem element pushbutton reciprocated.

6. A valve as described in claim 4 including valve member support means comprising a closed frame means disposed within said casing and circumferentially spaced from said operator support, said frame means having a portion received in an interior slot formation of said body and therein held captive by thrust of said cover through said flange portion of the diaphragm.

7. A valve as described in claim 6 wherein there is interposed, between one of said other inlet ports and its supply passage, a flow-throttling intermediate temperature-regulating adjustable valve means.

8. A valve as described in claim 7 wherein said adjustable valve means comprises a control bore intersecting a passage from the supply passage to the controlled port, an integrally molded thimble projecting from said diaphragm member into said control bore and a rotatable stem deforming said thimble in the control bore to vary the flow area to the controlled port.

9. A valve for control of a fluid comprising:

a hollow casing including a hollow body having one side open and having an inlet port and an outlet, and a cover member secured to and closing said open side, said cover member providing an operator support integrally formed on and extending from the cover inner side into the hollow of the body, said support having a bore opening through the cover and a slideway intersecting the bore and in alignment with the inlet port;

an elastomeric fluid-impervious diaphragm member having a hollow body portion surrounding the inwardly projecting said support and a peripherally continuous laterally flanged portion sealing engaged between the cover and the casing body, thereby to define fluid flow space between said inlet port and outlet, and form an effective watertight closure in the open body side sealing said support off from said fluid in the valve;

a fixed valving surface associated with said inlet port;

a movable valving member having a face cooperatively engageable with said fixed surface at the inlet port, the engageable areas of said face and surface providing an effective fluid seal when held in engagement;

means supporting said movable member, independently of the hereinafter named operator means, for movement toward and away from said surface as between valve closed and full open positions, the last said means comprising a frame disposed within said body and spaced from said operator support, said frame having a portion received in a body interior slot formation and held captive therein by thrust of the cover through the diaphragm flange portions, said frame defining an aperture aligned between said slideway and said port to receive the said moveable member thereby supported; and valve operator means including a slide movable in said slideway and a slide operating stem member moveable in the said bore having a camming engagement with the slide for camming the slide outwardly against the diaphragm and thereby upon movement of said stem member in one direction to communicate motion and force through said diaphragm to said moveable valving member to move the latter toward and hold it in valve closed position against fluid pressure at the inlet port, and, upon movement of the stem member in a second direction for valve opening, said movable valving member moveable away from said inlet port.

10. A valve as described in claim 9, wherein said face is provided by a hard annular element as an insert bonded within the casing body to form the mouth of said inlet port, and having the end surface about the mouth finished highly flat and smooth, and said moveable member is a plate element of hard material having a face disposed toward said insert end surface finished highly flat and smooth.

11. A valve as described in claim 10, wherein said elements are comprised of a hard ceramic material.

12. A valve as described in claim 9, wherein said operating stem member is a pistonlike element reciprocable in the bore and has a longitudinally sloping cam surface engaging said slide.

13. A valve as described in claim 9 including a second inlet port for a fluid differing from that supplied to the first said inlet port, and further including for the second inlet port, as described for the first port, a fixed valving surface and cooperating moveable valving member in a respective frame aperture valve operator means.

14. A valve as described in claim 9 wherein said diaphragm member includes an externally convex integrally thickened region between the slide of said operating means and the moveable valving member.

15. A mixing-type water valve for controlled volume delivery selectively of hot water and cold water at respective supply temperatures and mixed water at at least one preset intermediate temperature, comprising:

a hollow casing including an open-topped hollow body and a cover member secured to and closing the body top, said body having an outlet, a plurality of water inlet means including lateral inlet ports, a cold water supply-connected passage opening through one inlet port as a cold inlet port into the body hollow, and a hot water supply-connected passage opening through a second inlet port as a hot water inlet port into the body hollow, said cover providing operator support means extending into the hollow of the body;

an elastic resilient fluid-impervious diaphragm member surrounding said support means within and sealed to the casing to define fluid flow space between said inlet ports and said outlet, said diaphragm member sealing said support means off from water in the valve;

a fixed valving surface surrounding each said inlet port among said inlet means and, cooperating therewith to comprise valving means, a moveable valving member having a face engageable with said fixed surface continuously around the respective inlet port, the engageable areas of each of said face and the respective surface providing an effective fluid seal when held in engagement, each said moveable member supported for movement toward and away from the respective said surface as between valve closed and full open positions, first valve-operating means controlling only the said first inlet port for volume controlled delivery of only cold water supplied thereto from said cold water supply-connected passage;

second valve-operating means controlling only the said second inlet port for volume controlled delivery of only hot water supplied thereto from said hot water supply-connected passage; each said valve-operating means including a portion moveable in said support means in one direction to communicate motion and force through said diaphragm to the respectively port-associated moveable valving member to move the latter toward and hold it in valve closed position against fluid pressure at the respective inlet port, and moveable in a second direction for valve opening; third valve-operating means controlling simultaneously the discharge of hot and cold water from water inlet means other than said first and second inlet ports and supplied thereto from said hot water supply-connected and cold water supply-connected passages for volume controlled delivery of mixed water at an intermediate temperature, said third operating means including a portion moveable in said support means in one direction to communicate force and motion through said diaphragm to a valving means for the last said inlet means to change a valve setting toward and hold a valve closed condition, and moveable in opposite direction to establish valve open conditions.

16. A valve as described in claim 15, wherein each said valve-operating means includes a pistonlike element reciprocable in a respective bore in operator support means, and having a longitudinally sloping cam surface-engaging slide means shifting a respective said valve means, each said element reciprocated by a respective pushbutton-like manually manipulated element.